(12) United States Patent
Hull et al.

(10) Patent No.: US 8,729,656 B2
(45) Date of Patent: May 20, 2014

(54) YTTRIUM CONTACTS FOR GERMANIUM SEMICONDUCTOR RADIATION DETECTORS

(76) Inventors: Ethan Hull, Oak Ridge, TN (US);
Richard Pehl, Raymond, WA (US);
Bruce Suttle, Oak Ridge, TN (US);
James Lathrop, Oak Ridge, TN (US)

( * ) Notice: Subject to any disclaimer, the term of this patent is extended or adjusted under 35 U.S.C. 154(b) by 0 days.

(21) Appl. No.: 13/068,811

(22) Filed: May 20, 2011

(65) Prior Publication Data
US 2011/0298131 A1 Dec. 8, 2011

Related U.S. Application Data

(60) Provisional application No. 61/397,141, filed on Jun. 8, 2010.

(51) Int. Cl.
*H01L 31/00* (2006.01)
*A61N 5/00* (2006.01)

(52) U.S. Cl.
USPC ............ 257/459; 257/41; 257/457; 257/584; 257/602; 257/690; 257/734; 257/742; 257/E31.002; 257/E31.012; 250/492.1

(58) Field of Classification Search
USPC ............ 257/41, 72, 457, 459, 584, 602, 690, 257/734, 742, 749, 773, E31.002, E31.012
See application file for complete search history.

(56) References Cited

U.S. PATENT DOCUMENTS 3,629,670 A * 12/1971 Perusek et al. .................. 257/77
4,237,470 A 12/1980 Raudorf
4,589,006 A 5/1986 Hansen et al.
5,306,950 A * 4/1994 Fujikawa et al. ............. 257/750
6,806,507 B2 * 10/2004 Ishida ........................... 257/101

OTHER PUBLICATIONS

"Amorphous-semiconductor-contact germanium-based detectors for gamma-ray imaging and spectroschopy", pp. 886-890, May 31, 2007.*
H.L. Malm, "Properties of metal Surface Barriers on High Purity Germanium," IEEE Trans. Nuclear Science, 1975, p. 140, NS-22.
G.S. Hubbard, E.E. Haller, W.L. Hansen, "Ion Implanted N-type Contact for High-Purity Germanium Radiation Detectors," IEEE Trans. Nucl. Sci., 1977, p. 161, NS-24.
W.L. Hansen and E.E. Haller, "Amorphous germanium as an electron or hole blocking contact on high-purity germanium detectors," IEEE Trans. Nucl. Sci., 1977, p. 61, NS-24.
P.N. Luke, C.P. Cork, N.W. Madden, C.S. Rossington and M.F. Wesela, "Amorphous Ge Bipolar Blocking Contact on Ge Detectors, " IEEE Trans. Nucl. Sci.,1992, p. 590, 39 No. 4.
E.L. Hull, R.H. Pehl, J.R. Lathrop, B.S. Suttle, "Yttrium hole-barrier contacts for germanium semiconductor detectors." Nucl. Instr. and Meth, 2011, p. 39-42, A 626-627.
IEEE (Institute of Electrical and Electronics Engineers, Inc.) is published in New York, New York.
Elsevier, Amsterdam, The Netherlands.

* cited by examiner

*Primary Examiner* — Jasmine Clark
(74) *Attorney, Agent, or Firm* — Pitts & Lake, P.C.

(57) ABSTRACT

A germanium semiconductor radiation detector contact made of yttrium metal. A thin (~1000 Å) deposited layer of yttrium metal forms a thin hole-barrier and/or electron-barrier contact on both p- and n-type germanium semiconductor radiation detectors. Yttrium contacts provide a sufficiently high hole barrier to prevent measurable contact leakage current below ~120 K. The yttrium contacts can be conveniently segmented into multiple electrically independent electrodes having inter-electrode resistances greater than 10 GΩ. Germanium semiconductor radiation detector diodes fabricated with yttrium contacts provide good gamma-ray spectroscopy data.

17 Claims, 4 Drawing Sheets

YTTRIUM CONTACTS FOR GERMANIUM SEMICONDUCTOR RADIATION DETECTORS

CROSS REFERENCE TO RELATED APPLICATIONS

This application claims the benefit of the filing date of the U.S. Provisional Patent Application No. 61/397,141 filed Jun. 8, 2010, the disclosure of which is hereby incorporated herein by the reference.

STATEMENT REGARDING FEDERALLY SPONSORED RESEARCH OR DEVELOPMENT

This invention was made with government support under DE-SC0002477 awarded by the U.S. Department of Energy Office of Nuclear Physics. The government has certain rights in the invention.

BACKGROUND OF THE INVENTION

This invention has been publicly disclosed in the peer reviewed journal article: Hull E L, R. H. Pehl, J. R. Lathrop, B. S. Suttle, "Yttrium hole-barrier contacts for germanium semiconductor detectors." Nucl. Instr. and Meth. A 626-627 (2011) p. 39-42 (2011), having an online publication date of Oct. 14, 2010.

Germanium semiconductor single particle radiation detectors require both electron-barrier and hole-barrier contacts to provide full depletion and sufficient electric field for good charge-carrier collection while blocking the flow of significant leakage current. In addition, the contacts must provide a sufficiently conductive electrical connection to the germanium to avoid series noise problems. The negatively biased electron-barrier contact can be fabricated using several well developed technologies. Electron-barrier contacts can be fabricated by deposition of thin (~1000 Å) metal layers directly onto the crystalline germanium surface. Gold, nickel, chromium, platinum, and palladium have been demonstrated to form good Schottky electron-barrier contacts on germanium semiconductor radiation detectors. The most comprehensive publication describing metal electron-barrier contacts is H. L. Malm, "Properties of Metal Surface Barriers on High Purity Germanium," IEEE Trans. Nucl. Sci., NS-22, p. 140, (1975). Most germanium detector manufacturing now relies on thin boron implanted p+ contacts to provide the electron-barrier contact. All these electron-barrier contacts are sufficiently thin to allow segmentation into arbitrary contact geometries and provide thin dead layer entrance windows on the live detector volume for minimal charged particle energy loss and photon attenuation.

Historically, the use of germanium semiconductor radiation detectors has been adversely affected by the lack of a convenient thin hole-barrier contact to serve opposite these thin electron-barrier contacts. The industry relies upon thick, as thick as 1 mm, lithium diffused n+ hole-barrier contacts as the standard contacts. Although lithium contacts can be made less thick, they cannot approach the 1000 Å thickness level required for a truly thin particle entrance window. Although extremely rugged, reliance upon thick lithium diffused contacts has greatly limited the use of germanium detectors as transmission detectors in charged-particle telescopes for nuclear physics experiments. In addition, lithium diffused contacts prohibit the transmission of low energy photons for low energy photon spectroscopy. The thin electron-barrier contact must always be used as the particle entrance window.

Lithium diffused contacts can be coarsely segmented by grinding through the lithium diffused layer and/or by the use of relatively wide gap features between segments. However, the inherent thickness of the lithium diffused layer presents a significant limitation to the segmentation feature sizes possible. A thin hole-barrier contact that permits low energy photon transmission and that can be finely segmented in a convenient manner would be a tremendous improvement in germanium-detector technology.

The search for a thin hole-barrier contact on germanium detectors has continued since the 1970s. Phosphorus implanted n+ contacts were successfully implemented in long standing nuclear physics array and telescope programs as described in G. S. Hubbard, E. E. Haller, W. L. Hansen, "Ion Implanted N-type Contact for High-Purity Germanium Radiation Detectors," IEEE Trans. Nucl. Sci. NS-24 No. 1, p. 161, (1977). However, fabrication of the phosphorus implanted n+ contact is an extremely involved process requiring high temperature annealing steps that can significantly harm the charge collection properties of the germanium crystal. Despite great effort, phosphorus contacts have not consistently supported the high electric fields needed for optimum charge collection. This is particularly crucial in situations where radiation damage is a concern. Few, if any, phosphorus implanted n+ contacts are manufactured on germanium detectors at this time. Most detector makers have turned to amorphous germanium and amorphous silicon contacts for thin electron-barrier and/or hole-barrier contacts requiring segmentation. Amorphous germanium contacts were first described in W. L. Hansen and E. E. Haller, "Amorphous germanium as an electron or hole blocking contact on high-purity germanium detectors," IEEE Trans. Nucl. Sci., NS-24, No. 1, p. 61, (1977) and later in P. N. Luke, C. P. Cork, N. W. Madden, C. S. Rossington, M. F. Wesela, "Amorphous Ge Bipolar Blocking Contacts on Ge Detectors," IEEE Trans. Nucl. Sci. 39 No. 4, p. 590 (1992). Unfortunately, amorphous semiconductor contacts are not as stable or repeatable as desired. Amorphous germanium contacts do not always form sufficiently high charge injection barriers to prevent significant leakage current at higher temperatures (~95 K). However, compared to phosphorus implantation or lithium segmentation, amorphous germanium and amorphous silicon contacts require far less fabrication complexity and support reasonably high electric fields on a sufficiently consistent basis to be useable at lower detector operating temperatures (~85 K). Although not ideal, amorphous germanium and amorphous silicon contacts have provided the most versatile thin and segmented contacts for germanium detectors in recent years.

SUMMARY OF THE INVENTION

An object of the invention is to provide improved germanium-detector contact technology for the hole-barriers or positively biased contacts on germanium semiconductor radiation detectors. In particular, an object of the invention is to provide a thin hole-barrier contact that can be conveniently segmented. An additional object of the invention is a contact technology that can also serve as reasonable electron-barrier contacts thereby allowing both polarity contacts to be fabricated using the same processes. Yttrium metal forms excellent thin hole-barrier contacts when deposited onto germanium. Yttrium metal also forms reasonable electron-barrier contacts when deposited onto germanium. Yttrium contacts can be conveniently segmented into an arbitrary number of electronically independent contact segments conveniently using ordinary semiconductor photolithography. When germanium detectors with yttrium contacts are cooled to the liquid nitrogen temperature range, the yttrium contact immediately demonstrates the formation of the historically elusive hole-barrier contact capable of withstanding reasonably high electric fields. The yttrium contact also provides a reasonable electron-barrier contact. In addition, the thin yttrium layer provides a sufficiently good metallic connection to the active volume of the germanium detector to facilitate excellent gamma-ray spectroscopy.

DETAILED DESCRIPTION OF REPRESENTATIVE EMBODIMENT

For illustrative purposes, a representative embodiment of the invention is described hereinafter in the context of a radiation detector. It will be understood, of course, that the utility of the yttrium metal contact on germanium detectors is not limited to the representative embodiment described specifically but extends quite readily to all germanium semiconductor detector embodiments used for a wide variety of applications including, but not limited to, x-ray detection, gamma-ray detection, charged particle detection, gamma-ray imaging, and other fields where a thin germanium detector contact or a contact that can be segmented into multiple electrodes is preferred. This is quite apparent as all germanium semiconductor radiation detectors operated in single-photon counting mode utilize detector contacts to serve as hole-barrier contacts, electron-barrier contacts, or both hole- and electron-barrier contacts. It is impossible to operate such a germanium semiconductor detector without at least one contact forming a charge-injection barrier.

Figure 1:
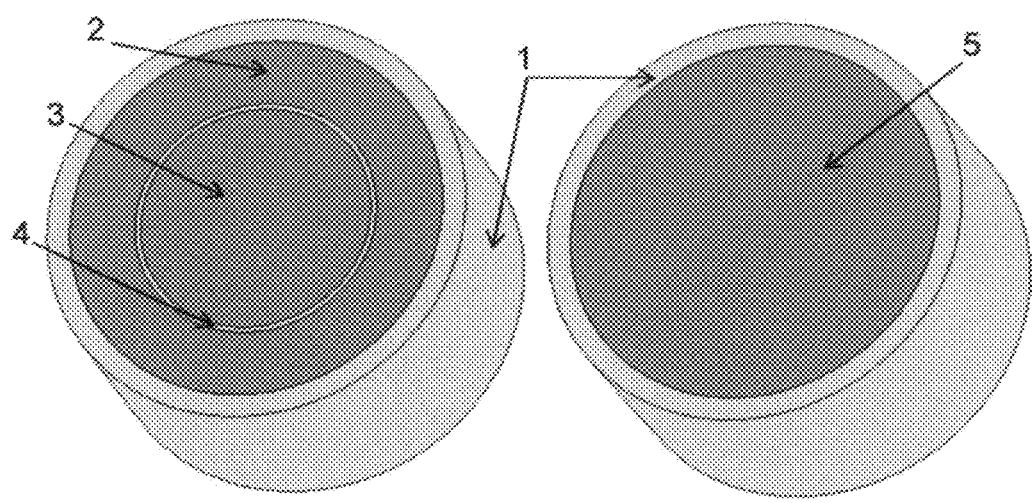
FIG. 1 shows two three-dimensional views of a representative embodiment of the yttrium metal contacts on a planar germanium detector in accordance with the present invention wherein the yttrium metal contact covering the germanium is represented by the darker grey color while the uncoated germanium is represented by the lighter grey color on both the segmented side on the left view having 2 yttrium-metal contact segments and the non-segmented side on the right having one yttrium-metal contact segment.

In FIG. 1 a single-crystal germanium right cylindrical planar detector is shown with yttrium-metal contacts. The germanium surface areas not coated with yttrium metal 1 and 4 are represented by the lighter gray shading. The yttrium coated contact surface areas 2, 3, and 5 are represented by the darker gray shading. In the case of this representative embodiment, two planar surfaces of the germanium detector are coated with yttrium metal areas that serve as the hole-barrier and electron-barrier contacts. In FIG. 1 on the left, yttrium contact is segmented into a center contact 3 and guard ring contact 2. In FIG. 1 on the right, the yttrium contact is a single non-segmented contact 5. Alternatively, both planar surfaces of the detector could be segmented into any arbitrary pattern of yttrium contacts during the detector fabrication. In this representative embodiment, the annular area 4 between the center yttrium contact 3 and guard-ring yttrium contact 2 is 0.25 mm wide. The center yttrium contact 3 has a diameter of 11 mm. The guard ring yttrium contact 2 and yttrium contact 5 have outside diameters of 18 mm. The outside diameter of the germanium detector is 20 mm, the thickness is 10 mm. Alternatively, the yttrium contacts and the piece of germanium could be fabricated in any other geometry consistent with reasonable detector depletion and charge collection. The areas of the detector not coated with yttrium 1 and 4, sometimes called intrinsic surfaces, can be coated with hydrogenated amorphous germanium to stabilize or passivate these surfaces against conductive surface channels due to vacuum inconsistencies and thermal cycles as described, for example, in U.S. Pat. No. 4,589,006 to Hansen. The areas of the detector 1 and 4 can also employ physical surface features to mitigate surface conduction channels of the spirit described by U.S. Pat. No. 4,237,470 to Raudorf. Both of these patents pertain to controlling the intrinsic surfaces between the contacts while the invention here pertains directly to the detector contacts themselves.

Detectors were fabricated following the representative embodiment of the yttrium contact shown in FIG. 1. Data demonstrating the viability of the yttrium-metal hole-barrier and electron barrier contacts in this representative embodiment will be shown after the fabrication process is described. A germanium wafer is chemically etched using a mixture ratio of 3:1 nitric to hydrofluoric acid. The wafer is then rinsed with CMOS grade methanol and blown dry with $N_2$ gas. The wafer is inserted into an MRC 8667 RF sputter deposition system and pumped with a cryogenic high vacuum system to a vacuum of $4 \times 10^{-7}$ Torr requiring approximately one hour. A thin layer of yttrium metal is RF sputter deposited onto the upward facing side. The sputtering system is vented to dry nitrogen, opened, and the germanium wafer is turned over and returned to the base plate for an identical process deposition on the second side of the germanium wafer. Because of the scatter of the yttrium atoms in the argon sputter gas, the wafer is well coated with yttrium metal sputtered on all sides after the second deposition. The sputter deposition duration in this representative embodiment was tuned to deposit an approximately 1000-Å thick yttrium metal layer. However, good hole-barrier and electron-barrier contact formation is observed over a range of thicknesses from 200 Å to 4000 Å.

Photolithography is used to segment the yttrium contacts. In this example process, a layer of standard positive semiconductor photoresist approximately 1 μm thick is deposited onto the two planar surfaces of the yttrium coated germanium wafer using a photoresist spinner. A standard chromium-on-glass photomask having solid opaque chromium areas matching the intended areas of yttrium contacts 2 and 3 is placed over the yttrium metal on the side of the detector intended to be the segmented side. The photoresist is exposed to ultraviolet light through the photomask for a suitable duration. The side intended to be the non-segmented side of the detector is exposed in the same manner using an opaque chromium area having the contact geometry of 5. The wafer is placed in a suitable photoresist developer solution for a period of time (approximately 2 minutes) to develop the exposure patterns and cause the regions not protected by the opaque chromium areas on the photomask to rinse away from the wafer. The wafer is then rinsed again using deionized water to completely remove any undesired photoresist or developer residue in regions 1 and 4 of the wafer. The wafer is dipped into a 5% solution of HCl for 10-20 seconds to remove the yttrium everywhere not protected by the photoresist. The wafer is rinsed in deionized water. The photoresist is rinsed away from the surface of the wafer with a solvent such as methanol and the wafer is now a completed detector. The completed detector is then loaded into a vacuum cryostat capable of cooling the detector into the liquid nitrogen temperature regime. From this process description, it is readily apparent that any pattern of segments could be formed on the surfaces of the germanium detector with choice of a particular photomask pattern.

Alternatively, the detector fabrication process can be done by placing the negative of the described photoresist pattern on the bare germanium wafer before the yttrium-metal is deposited onto the wafer. After the deposition, a simple rinse with a solvent such as methanol eliminates the photoresist and the yttrium deposited on the photoresist leaving only the yttrium metal on the desired contact areas 2,3, and 5.

Alternatively, the yttrium-metal contact can be deposited on only one side of the detector to form either the hole-barrier or electron-barrier contacts while another contact such as nickel, gold, chromium, palladium, platinum, diffused lithium, or implanted boron can be deposited on the opposite side of the detector to serve as the opposite polarity contact.

Alternatively, the yttrium-metal contact can be deposited on the surfaces of the wafer with other physical vapor deposition techniques including but not limited to DC sputter deposition, thermal evaporation, electron beam evaporation, or ion implantation.

Yttrium metal was chosen because it has a relatively low work function, 3.1 eV. In addition, yttrium is reasonably stable and does not react excessively with air, unlike many other low work-function metals. It can be handled conveniently, is not horribly toxic, and can be obtained in bulk at reasonable cost. Consequently, it is suitable for fabrication of large area targets for physical vapor deposition systems. Yttrium has the correct combination of metal work function and/or interface states when deposited on a germanium semiconductor surface to form the elusive hole-barrier contact required to manufacture germanium detectors. Even more, it creates a reasonable electron barrier. The measured leakage current, hole-barrier height, spectroscopy, segmentation, and fabrication yield promote the yttrium contact as the contact of the future for segmented germanium detector fabrication. The yttrium contact also is a thin-window alternative to the thick lithium diffused contact on the outside of p-type coaxial detectors.

Figure 2:
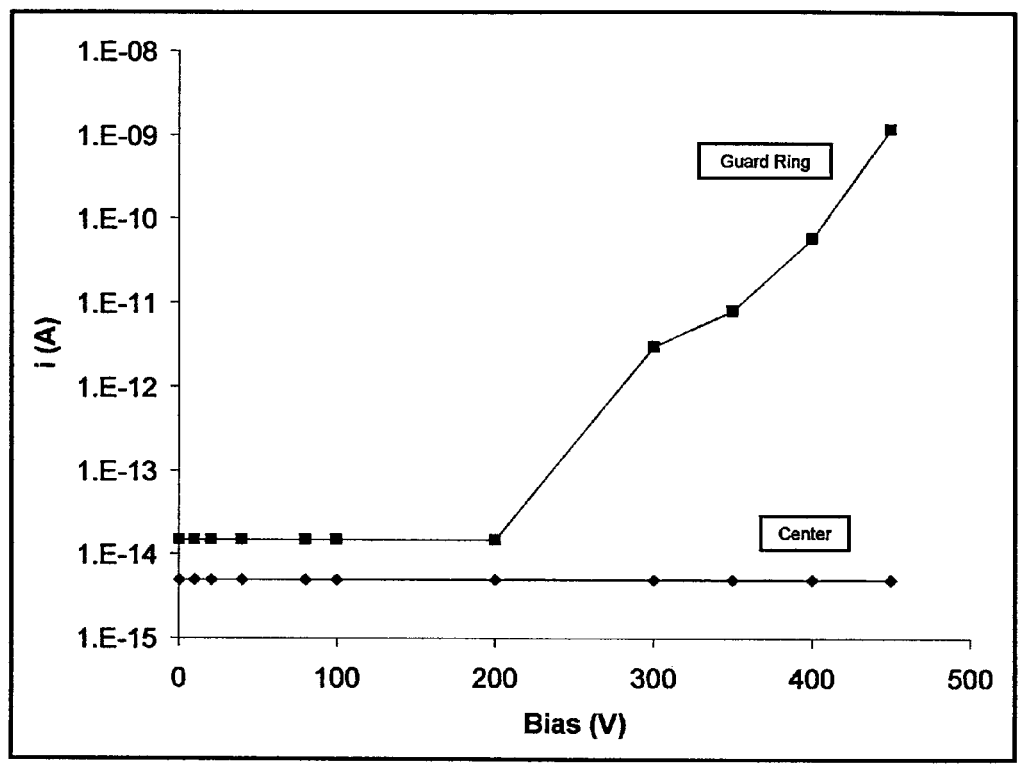
FIG. 2 is a logarithmic plot of the leakage current as a function of bias voltage from a germanium detector operating at 80 K having the yttrium-metal contact and detector geometry of FIG. 1.

The viability of yttrium contacts on germanium detectors has been demonstrated through leakage current, barrier height, and gamma-ray spectroscopy measurements. On the very first and numerous subsequent fabrication attempts, yttrium contacts were observed to provide excellent hole-barrier contacts. The detector leakage current behavior demonstrated strong rectification of the yttrium contact on p-type germanium. A p-type detector of the geometry shown in FIG. 1 was fabricated as described above. The detector was loaded into a liquid nitrogen cooled vacuum cryostat and allowed to stabilize at 80 K for several hours. The cryostat used to cool the detector was a dipstick style vacuum cryostat of conventional design requiring no further detailed description for those skilled in the art. The resistance between the center and guard-ring segments was measured to be greater than 1000 GΩ, sufficiently high that no measurable current (<0.1 pA) flowed between the slightly different gate voltages of the individual charge-sensitive resistive feedback preamplifiers attached to the center 3 and guard-ring 2 segments of the low-voltage side of the detector. In this case, the p-type germanium was depleted from the segmented low-voltage yttrium contact 2 and 3 with negative bias applied to the high-voltage contact 5. As the bias was increased, the leakage current was monitored by observing changes in the DC feedback voltages of the individual charge-sensitive resistive-feedback (1 GΩ) preamplifiers connected to the center and guard-ring detector segments. In some cases, the guard-ring contacts exhibited substantial leakage current due to surface channels on the non passivated intrinsic surface. An example of the leakage current vs. bias voltage behavior from a detector having the geometry of FIG. 1 that was fabricated as described above is shown in FIG. 2. The leakage current from the center segment 3 is essentially zero. In FIG. 2 a value of $5 \times 10^{-15}$ amperes is assigned to represent zero measured leakage current on the logarithmic scale for the center contact. In FIG. 2 a value of $1.5 \times 10^{-14}$ amperes is assigned to represent zero measured leakage current on the logarithmic scale for the guard-ring contact. This particular p-type detector was fully depleted at 120 V. The lack of measurable leakage current from the center contact indicates the formation of a good hole-barrier contact on the segmented low voltage side and a reasonably high electron barrier on the non-segmented high voltage side of the detector. The leakage current on the guard ring is rather high. This is likely because the intrinsic surface was not passivated. However, the center contact data proves that the yttrium formed a good hole-barrier contact.

Figure 3:
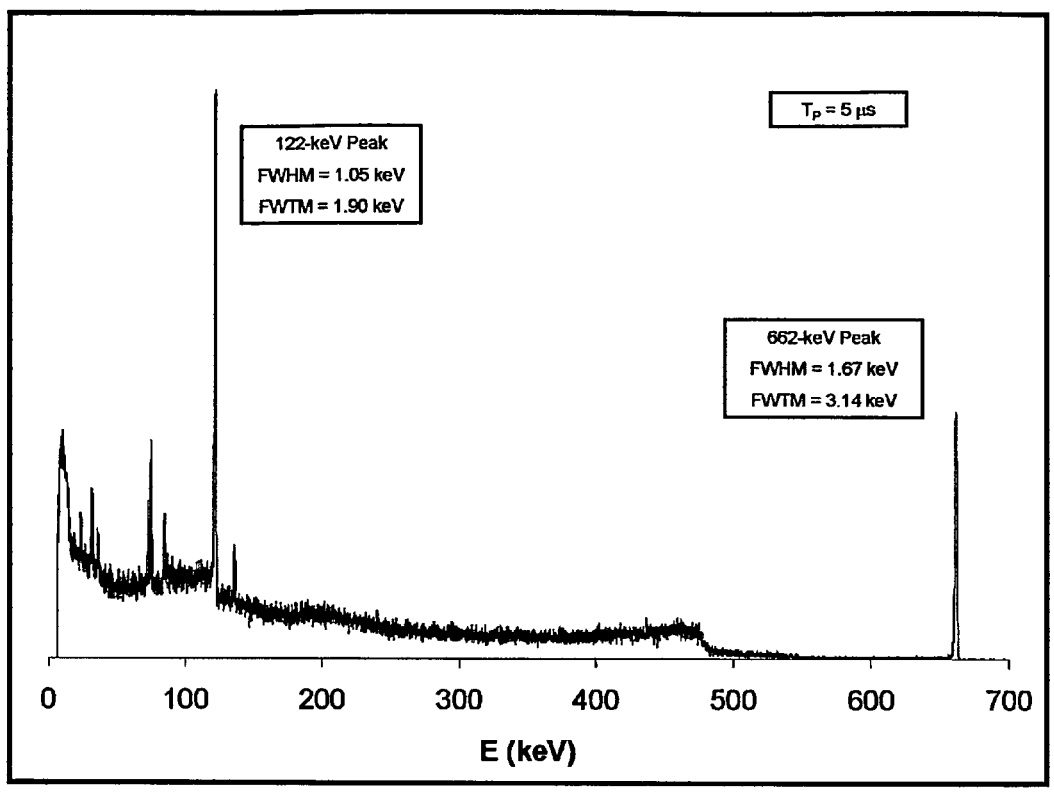
FIG. 3 is a gamma-ray energy spectrum containing data from the center contact segment of a germanium detector operating at 80 K having the yttrium-metal contact and detector geometry of FIG. 1.

The p-type detector producing the leakage current data shown in FIG. 2 was biased at −400 V for a gamma-ray spectroscopy measurement. The gamma-ray energy spectrum accumulated from $^{57}$Co and $^{137}$Cs sources shown in FIG. 3 demonstrates the viability of the yttrium contact for gamma-ray detection, spectroscopy, and for use with segmented contact applications including imaging germanium detectors. The spectrum in FIG. 3 presents the first public demonstration of a functioning germanium gamma-ray detector having yttrium metal hole-barrier and electron-barrier contacts. Fully depleted planar detectors were also fabricated with comparable results using n-type germanium. Fully depleted planar detectors were also fabricated with comparable results having chromium or nickel electron-barrier contacts while relying on yttrium contacts as the hole-barrier contacts. The gamma-ray energy spectrum in FIG. 3 was accumulated using a peaking time of 5 μs using a conventional germanium detector spectroscopy system requiring no further description to those skilled in the art.

An analysis of the yttrium hole-barrier height was conducted by measuring the leakage current as a function of temperature. One of the detectors was biased at −40 V, well below the −120 V depletion voltage. The low bias keeps the guard-ring leakage current reasonably low, even at higher operating temperatures. Maintaining the detector at a bias well below depletion focuses attention on the yttrium hole-barrier contact only. The maximum electric field occurs at the yttrium hole-barrier contact on the low-voltage segmented side of the p-type germanium detector while no electric field occurs at the electron-barrier contact on the high-voltage side of the detector. Therefore, no possible leakage current contribution should arise from the electron-barrier contact. The detector was biased at −40 V after achieving thermal equilibrium at 80 K. The temperature of the detector mounting plate was elevated slowly (over many hours) while the leakage currents from the center and guard-ring yttrium contacts were monitored. Over the first 40 K temperature increase, the leakage current from the center segment was less than $1 \times 10^{-12}$ amperes. The leakage current from the guard-ring segment, which undoubtedly arose from the intrinsic surface of the detector, became measurable at 97 K. Leakage current through the center segment became measurable at 120 K and increased consistently with temperature until the measurement was halted at 150 K.

Figure 4:
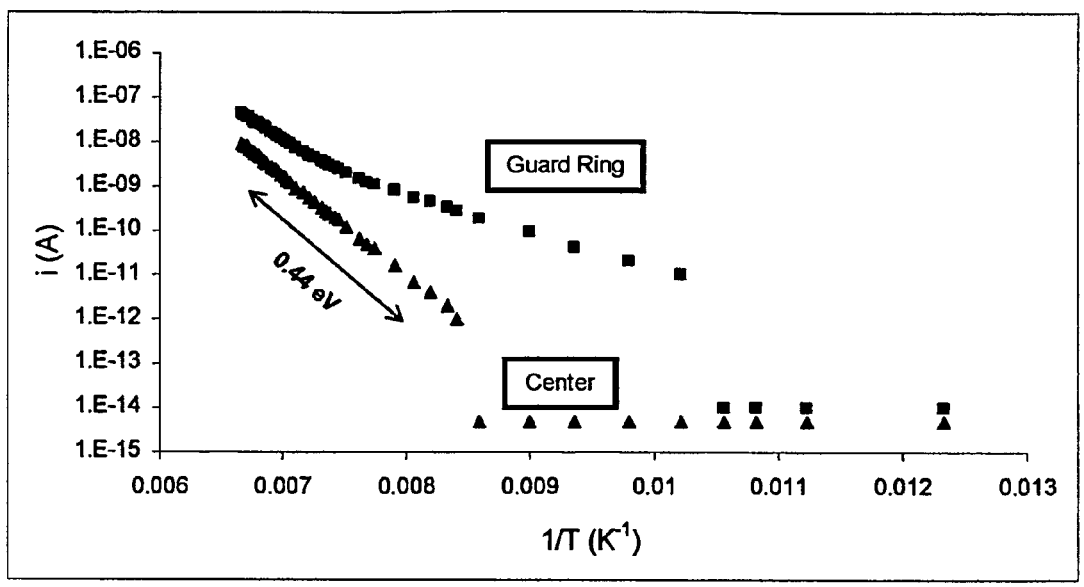
FIG. 4 is a logarithmic plot of the leakage current as a function of temperature expressed in inverse temperature from the center and guard-ring segments of a germanium detector having the yttrium-metal contact and detector geometry of FIG. 1.

FIG. 4 shows a plot of the leakage current from the center and guard-ring segments of the detector plotted against inverse temperature. Thermionic emission of charge carriers over an energy barrier dictates that the thermionic current varies with temperature as $i \sim \exp(-\phi/k_B T)$ where $\phi$ is the barrier height, $k_B$ is Boltzman's constant=$8.62 \times 10^{-5}$ eV/K and T is the Kelvin temperature. On a logarithmic-linear plot, the thermionic leakage current component vs. 1/T should follow a linear progression where measureable. The center-contact leakage current vs. 1/T data set indeed follows a fairly linear progression after becoming measurable at 120 K. This region of the curve has a slope corresponding to a yttrium hole-barrier height $\phi$=0.44 eV.

The relatively high hole-barrier height, low leakage current below 120 K, reasonable electron barrier, and the relative ease of fabricating segmented or non-segmented yttrium-metal contacts make the yttrium contact extremely useful for germanium semiconductor radiation detector fabrication.

Although the invention has been described and illustrated by reference to representative embodiments thereof, it will be understood that such embodiments are susceptible of modification and variation without departing from the inventive concepts disclosed. All such modifications and variations, therefore, are intended to be included within the spirit and scope of the appended claims.

We claim:

1. A germanium semiconductor radiation detector including a hole-barrier contact made of yttrium metal operated at temperatures below 150 K and wherein the yttrium metal contacts the germanium semiconductor.

2. A germanium semiconductor radiation detector including a hole-barrier contact made of yttrium metal and a germanium semiconductor radiation detector including an electron-barrier contact made of yttrium metal wherein these yttrium metal contacts are on the same detector and wherein these yttrium metal contacts are operated at temperatures below 150 K and wherein the yttrium metal contacts the germanium semiconductor.

3. The germanium semiconductor radiation detector contacts according to claim 1 or 2 wherein one or more of the yttrium metal contacts are segmented into multiple contacts.

4. A germanium semiconductor radiation detector comprising: a germanium surface coated with a deposited layer of yttrium, said deposited layer of yttrium forming at least one yttrium contact, said deposited layer of yttrium having a thickness between 200 Angstroms and 4000 Angstroms.

5. The germanium semiconductor radiation detector of claim 4 wherein said deposited layer of yttrium forms a hole-barrier contact.

6. The germanium semiconductor radiation detector of claim 4 wherein said deposited layer of yttrium forms an electron-barrier contact.

7. The germanium semiconductor radiation detector of claim 4 wherein the germanium semiconductor radiation detector is a planar germanium detector.

8. The germanium semiconductor radiation detector of claim 4 wherein the germanium semiconductor radiation detector is a single-crystal germanium right cylindrical planar detector.

9. The germanium semiconductor radiation detector of claim 4 wherein the said deposited layer of yttrium has a thickness between 1000 Angstroms and 2000 Angstroms.

10. The germanium semiconductor radiation detector of claim 4 wherein the germanium semiconductor radiation detector is operated at temperatures below 150 K.

11. The germanium semiconductor radiation detector of claim 4 wherein the germanium semiconductor radiation detector is operated at temperatures below 120 K.

12. The germanium semiconductor radiation detector of claim 4 wherein portions of said germanium surface are not coated with said deposited layer of yttrium and wherein said deposited layer of yttrium is segmented into multiple electrically independent yttrium contacts.

13. The germanium semiconductor radiation detector of claim 12 wherein portions of said germanium surface not coated with said deposited layer of yttrium are coated with hydrogenated amorphous germanium.

14. The germanium semiconductor radiation detector of claim 13 wherein at least one of said multiple electrically independent yttrium contacts is a hole-barrier contact.

15. The germanium semiconductor radiation detector of claim 13 wherein at least one of said multiple electrically independent yttrium contacts is an electron-barrier contact.

16. The germanium semiconductor radiation detector of claim 13 wherein the germanium semiconductor radiation detector is operated at temperatures below 150 K.

17. The germanium semiconductor radiation detector of claim 13 wherein the germanium semiconductor radiation detector is operated at temperatures below 120 K.

* * * * *